Dec. 9, 1941. E. KAHN Re. 21,974

HAIR CURLER

Original Filed Sept. 20, 1937

INVENTOR.
Eugenia Kahn
BY Maurice Bloch
ATTORNEY.

Reissued Dec. 9, 1941 Re. 21,974

UNITED STATES PATENT OFFICE 21,974

HAIR CURLER

Eugenia Kahn, New York, N. Y.

Original No. 2,123,421, dated July 12, 1938, Serial No. 164,635, September 20, 1937. Application for reissue December 12, 1939, Serial No. 308,839

4 Claims. (Cl. 132—41)

This invention relates to hair curlers and has for one of its objects the provision of such a device comprising a pair of pivotally connected curling members, the said members being made of molded Bakelite or composition of similar properties, with the view of overcoming the undesirable features of the present day metal hair curlers.

Upon painstaking careful study, research, and investigation, I have discovered that the present-day metallic hair curlers in common use produce a detrimental effect upon the hair, particularly when the curlers are maintained in the wound hair while the latter are in damp condition, and more so when the hair curlers are so maintained in the hair for a period of several hours.

It is therefore the principal object of my invention to remedy the above mentioned serious disadvantage, and to provide an improved hair curler of the aforesaid type which will not affect the hair detrimentally under any circumstances or conditions, and may be thus utilized at all times with complete security from deleteriousness.

As a result of much experimenting with resort to practical and thorough trials with materials, hair under a variety of conditions, and periods of time for subjecting the materials with said conditions of hair, I have found that certain plastic materials, particularly the one known as "Bakelite," will not affect the human hair detrimentally, and may be therefore used in contact with hair with complete freedom from injury to the latter.

In carrying out the invention, therefore, I have constructed the hair winding bar and co-operating pivoted gripping arm, constituting the cardinal elements of said type of hair curler, of solid Bakelite.

Another objectionable or undesirable feature of the present day metal hair curlers are the sharp edges left on such curlers by the punching operation. Another objectionable feature of the present day metal hair curlers is the comparatively high cost of manufacture due to the fact that separate blanking and curling or bending dies are required and the curler parts must be handled several times before the device is finally completed.

Another object of the invention is the provision of a device of the character referred to in which the inner member or mandril is cylindrical and is provided with perforations extending the entire thickness thereof and which is further provided at one end thereof with a semi-tubular projection, the center line of which is parallel to the sides of the perforations so that it may be readily drawn out of the mold, the said projection forming anchorage means for clipping the hair retaining or clasping member in place over the curl.

A further object of the invention is the provision of such a hair curler in which the semi-tubular end or tip in combination with the end of the outer shell portion forms a complete tubular anchorage area for controlling the stress or pressure of the hair retaining or clasping member upon the curled hair.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described and illustrated in the accompanying drawing, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawing, in which—

Figure 1:
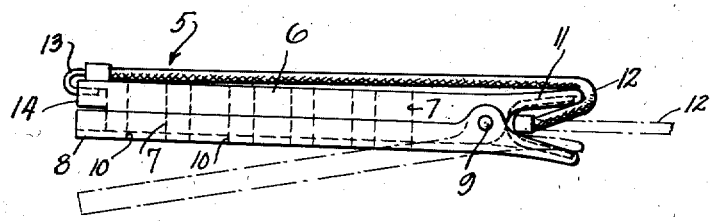
Figure 1 is a side elevation of my improved curler with the hair or curl retaining cord in locked or anchored position and showing the outer or shell member in dot and dash lines in open position.
Figure 2:
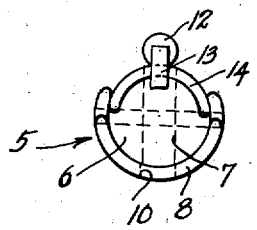
Figure 2 is an end view thereof looking from the left of Figure 1.
Figure 3:
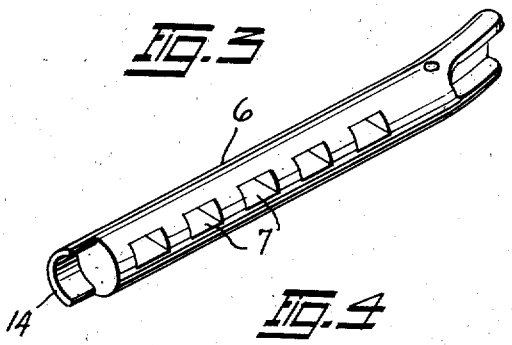
Figure 3 is a perspective view of the inner or cylindrical member.

Referring now to the drawing in detail 5 indicates my improved hair curler which comprises a cylindrical mandril, finger or curler member 6 which is preferably molded of Bakelite or similar material, and is provided with a plurality of openings or perforations 7 which may be rectangular as shown or which may be of any other desired shape or size. The said perforations extend through the entire thickness or diameter of the mandril 6.

Figure 4:
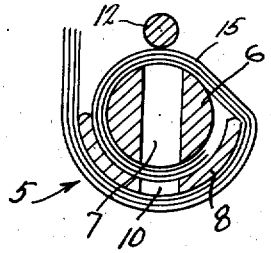
Figure 4 is a cross sectional view of the device with a lock of hair wound thereon.

The said member 6 as well as a semi-tubular member 8, comprising the curler, are pivoted together upon a pin 9 near one end of the device. The semi-tubular member 8, like the member 6, is provided with a plurality of holes or perforations 10 which are preferably in alignment with the perforations 7 in the member 6 to provide means for the circulation of air through the curler to enhance the drying action of the curls during the setting of the said curls. A spring 11 indicated in dotted lines at the right-hand end of Figure 1 serves to urge the curler members 6 and 8 together. A hair retaining elastic cord 12 is secured at one of its ends to the pivot end of the device and is provided with a hook 13 adapted to engage a semi-tubular projection 14 extending from the cylindrical member 6 at the end furthest from the pivot 9. The said end 14 as well as the end of the semi-tubular member 8 provide a full circular lip upon which the hook end 13 may be anchored, thus allowing for the adjustability of the tension exerted by the cord 12 upon the hair wound about the curling device. This arrangement further permits of the ready insertion of the clip or hook 13 anywhere along the circumference of the lip either after original winding of the curl 15 (Fig. 4), or after loosening same when wound too tightly.

It will readily be understood that due to the fact that the curler members 6 and 8 are molded all of their exposed surfaces and edges may be rounded during the molding operation, thus providing smooth surfaces throughout the device and avoiding sharp edges or corners upon which the hands of the user may be injured; such sharp metal edges or corners tend to cut or break the hair.

I have found that the metal hair curlers now commonly used have a tendency, when the hair is curled thereon, to make the hair brittle and causes the same to crack, whereas by making the curling members according to my invention of a molded Bakelite, such tendencies are entirely eliminated and hence, the hair of the user is preserved, as I have found that the constant use of metal curling devices will in the course of time have a serious deleterious effect upon the hair.

Hence, it will be seen that I have provided a hair curler which is not only simple and inexpensive in construction, but is highly efficient and hygienic when used upon the hair.

Having described my invention, what I claim as new and desire to secure by Letters Patent is:

1. A hair curling device, comprising a pair of pivotally connected molded spring tensioned curler members, one of the said members being semi-tubular in shape, and provided with spaced apart openings, the other member being cylindrical and provided with spaced apart openings in alinement with the openings in the first mentioned member, a semi-tubular projection at the end of the cylindrical member, the said projection and end of the semi-tubular member forming a circular lip at the end of the device, the sides of the openings in the said cylindrical member being parallel to a line passing through the center of the semi-tubular projection, an elastic hair retaining cord secured at one end to the device, and a hook on the said cord for releasably engaging the circular lip formed by the said projection and end of the semi-tubular member.

2. A hair-curling device, comprising a pair of pivotally connected molded curler members, one of the said members being semi-tubular in shape and provided with spaced apart openings, the other member being of solid cylindrical body and having spaced apart openings alining with the openings in the semi-tubular member, a semi-tubular projection, at the end of the solid cylindrical member, and a hair retaining means arranged to releasably engage the circular lip formed by the said projection, substantially as and for the purpose described.

3. A hair curling device comprising a pair of pivotally connected molded spring-tensioned curler members, one of said members being semi-tubular in shape, and provided with spaced-apart openings, the other member being solidly cylindrical and provided with spaced-apart clear-through openings in alignment with the openings in said first mentioned member, and an elastic hair-retaining cord secured at one end of the device having means for engaging the opposite end of the device.

4. A hair curling device comprising a pair of pivotally connected molded curler members, one of the said members being semi-tubular in shape and provided with spaced-apart openings, the other member being a solid cylindrical body and having spaced-apart clear-through openings aligning with the openings in said semi-tubular member, and a hair-retaining element secured to one end of the device having means for engaging the opposite end of the device.

EUGENIA KAHN.